Dec. 6, 1949     F. L. MELVILL     2,490,079
CONTACTING APPARATUS
Filed April 18, 1944     3 Sheets-Sheet 1
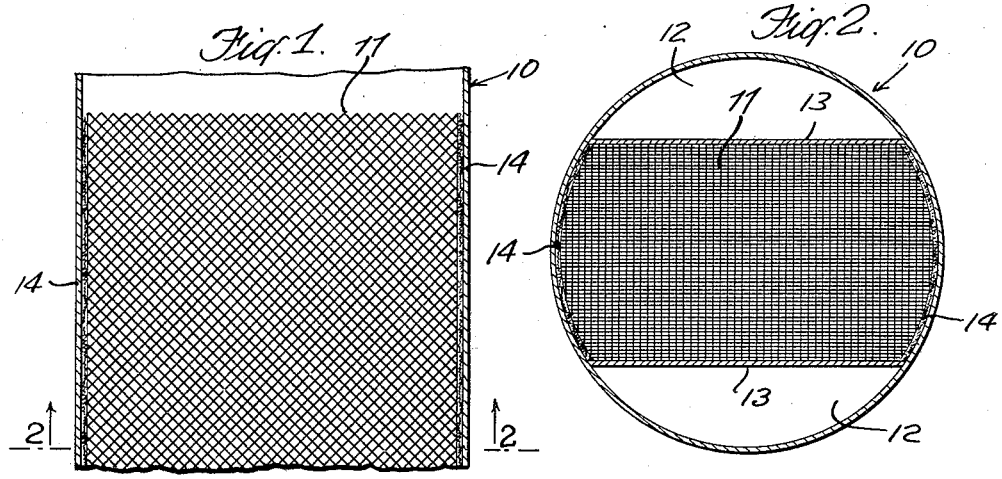
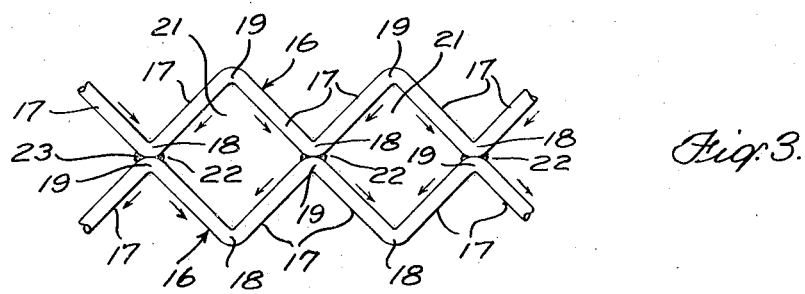
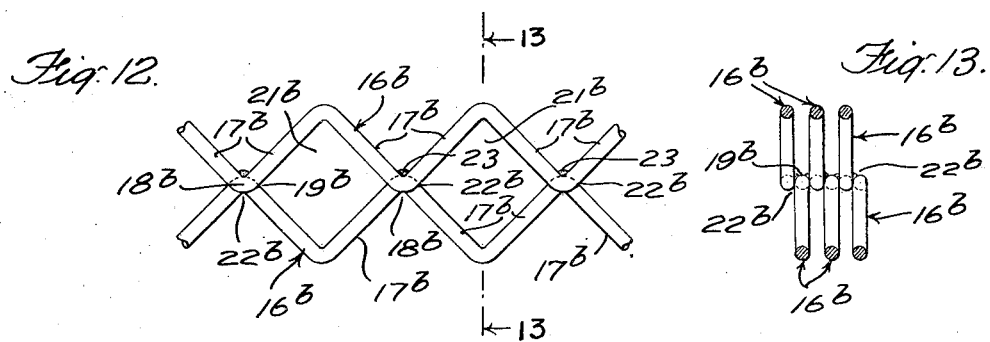
INVENTOR
FRANCIS L. MELVILL
BY Lee Allan Swem
ATTORNEY Dec. 6, 1949  F. L. MELVILL  2,490,079
CONTACTING APPARATUS
Filed April 18, 1944  3 Sheets-Sheet 2
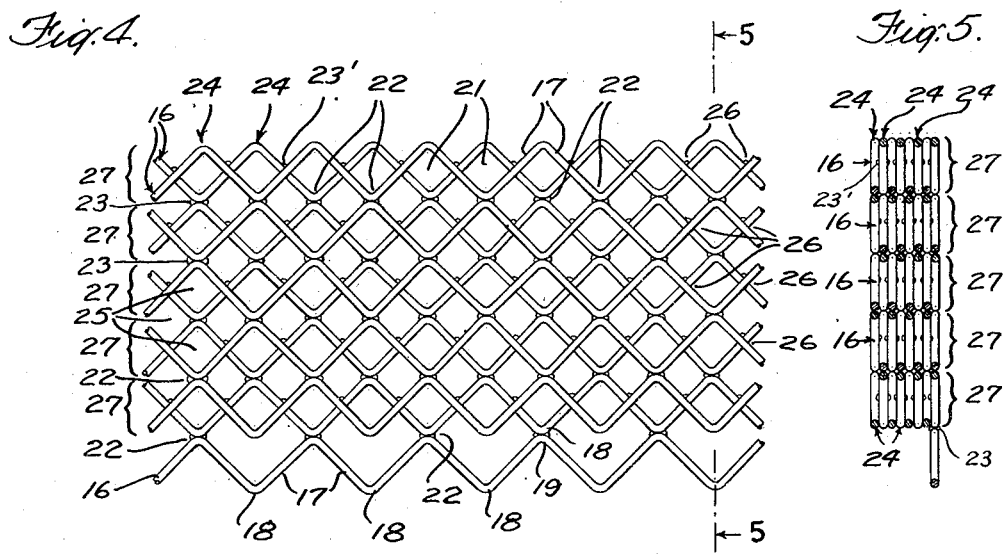
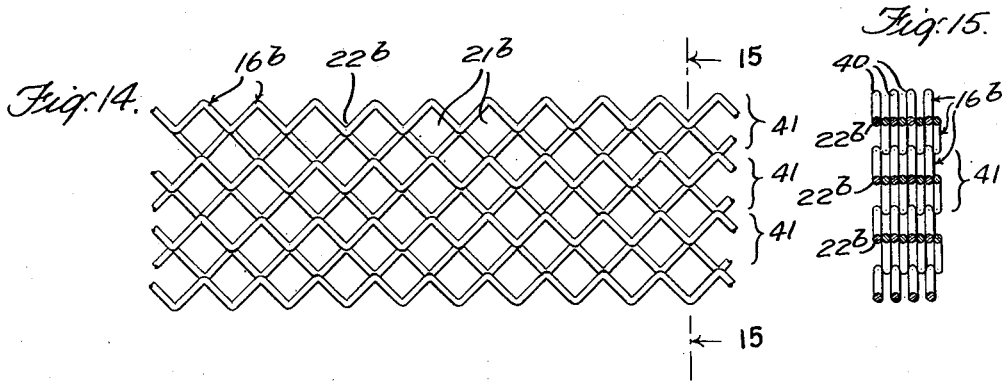
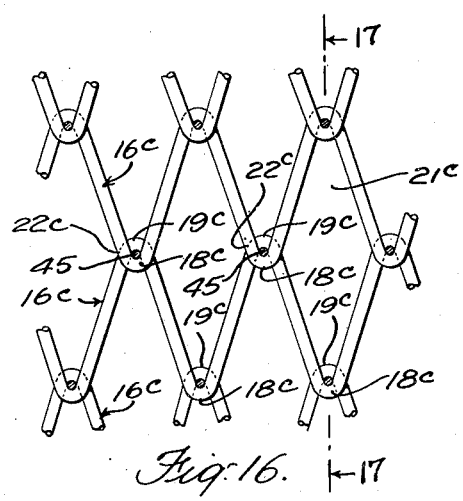
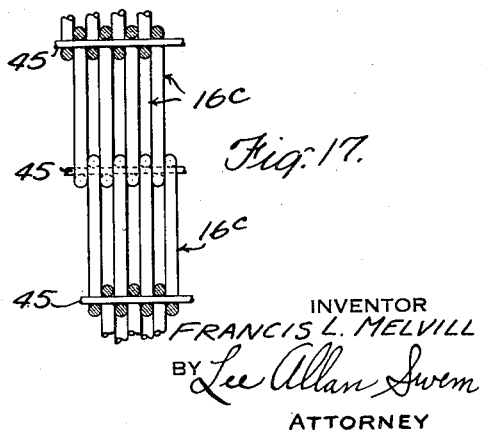
INVENTOR
FRANCIS L. MELVILL
BY Lee Allan Swem
ATTORNEY Dec. 6, 1949     F. L. MELVILL     2,490,079
CONTACTING APPARATUS
Filed April 18, 1944     3 Sheets-Sheet 3
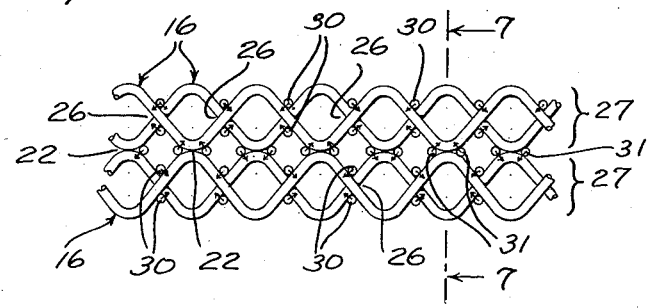
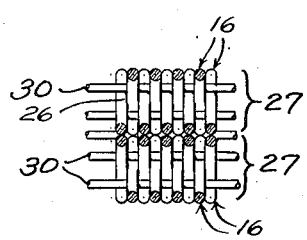
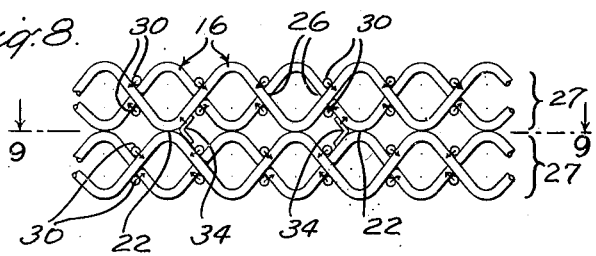
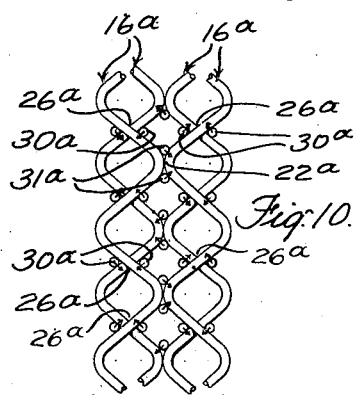
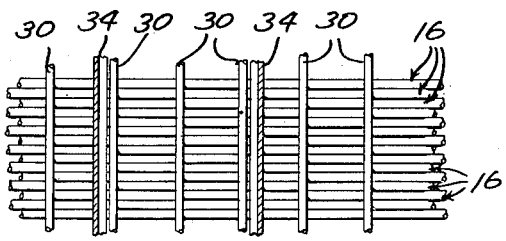
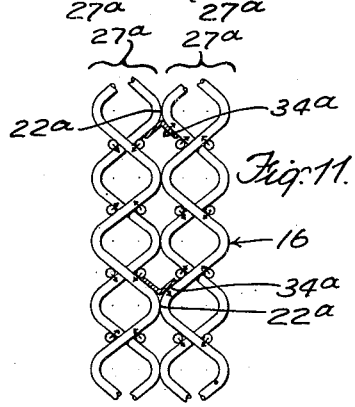
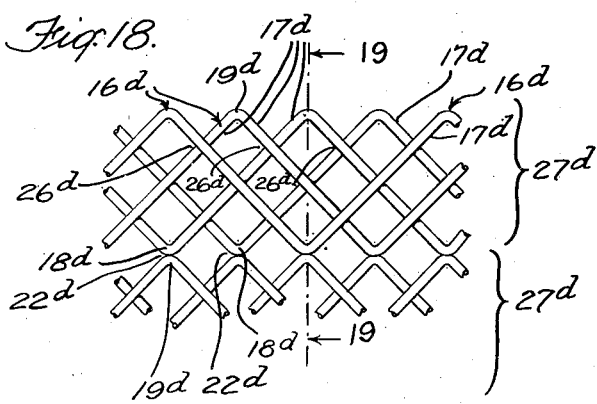
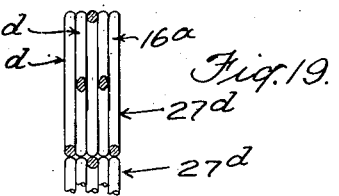
INVENTOR
FRANCIS L. MELVILL
BY Lee Allan Swem
ATTORNEY Patented Dec. 6, 1949

2,490,079

UNITED STATES PATENT OFFICE 2,490,079

CONTACTING APPARATUS

Francis L. Melvill, New York, N. Y.

Application April 18, 1944, Serial No. 531,589

14 Claims. (Cl. 261—94)

This invention relates to apparatus for the contacting of gases or vapors and liquids. Although the invention has a wide range of utility, it is particularly useful in connection with contacting methods and apparatus such as are employed for the absorption, cooling, drying, cleansing or humidifying of gases, for the evaporation, cooling or heating of liquids, or for reaction purposes. Such devices may, for example, take the form of fractionating towers, scrubbers, cooling towers and the like. In such apparatus, a packing is usually employed for effecting intimate contact between the descending liquid and the ascending gas or vapor. As used herein and in the claims, the term "gas" includes vapor within its scope.

The invention provides a new and improved countercurrent gas and liquid contact packing by which the flow of liquid downwardly through a treating chamber is effected in a regular predetermined symmetrical manner to assure uniform distribution of the liquid throughout the liquid flow area of the chamber, to offer maximum liquid surface to the action of the ascending gas, to retain the descending liquid for a period long enough to assure effective interaction between the liquid and the gas, and to allow free circulation of the ascending gas.

The invention provides a novel packing for gas and liquid contacting apparatus, which avoids the presence of unequal gas or liquid passages, causing channeling or segregation of the flowing gas in open spaces and of the liquid along surface areas, whereby at any cross-section of the packing at right angles to the general direction of countercurrent flow of the liquid and the gas, the composition of the gas and liquid is substantially uniform.

The invention also provides a new and improved packing of the general character described, which feeds and spreads out the liquid evenly in a thin film and in regular predetermined manner as it descends in a treating chamber, so that even distribution of the liquid throughout the flow area of the chamber is afforded which provides the maximum of effective (i. e., wetted) surface area per unit of packing space, which offers minimum of resistance to the passage of the ascending gas, and which affords the maximum of intimacy of contact and interaction between liquid and gas, so that equilibrium between the material in either phase immediately adjacent to the interface and the main bulk of the material comprising the phase is rapidly attained.

In operation liquid is subdivided in the packing of the present invention into a predetermined number of thin exposed streams which are directed along respective substantially uniform zig-zag courses sufficiently close together and at such wave phase relationship as to merge the apices of adjoining stream courses at regular equally spaced zones, whereby groups of adjoining streams merge and are intermixed at these zones, and are then subdivided into a corresponding number of thin streams for subsequent mergence with other streams. The mixing zones are staggered so that a network of thin liquid streams merging in groups at fixed intervals and following a predetermined pattern is formed, thus affording uniform distribution of the liquid across the full width of the flow area. The gas is circulated upwardly through the spaces formed between the liquid streams and into intimate contact with the streams, so that effective interaction between the liquid and the gas is assured.

Packing embodying the invention comprises slender packing elements in the form of rods, wires, tubes, flat strips or the like, which are shaped and arranged to form a network of predetermined pattern, and to define symmetrical courses along which the feed liquid is directed as thin exposed filmiform streams. These streams encircle the elements, so that comparatively large surface stream areas are exposed in relationship to the cross-sectional areas of the streams. The packing elements extend convergingly downwardly in groups toward junctures at predetermined equally spaced intervals, to form mixing zones where streams of one group merge and are intermixed, and extend divergingly downward from these juncture zones in groups of similar number to subdivide and redistribute the merged streams into a corresponding number of other streams. The liquid flowing down a single element of the packing is regularly mixed with liquid flowing down adjacent elements of the packing, and the resulting mixture is then redistributed among elements diverging from the mixing zone, each of these redistributed streams carrying substantially the same aliquot part of the liquid reaching the mixing zone from above.

The invention will be understood from the following description when considered in connection with the accompanying drawings forming a part thereof and in which:

Fig. 1 is a fragmentary axial vertical section, somewhat diagrammatic, of a gas and liquid contacting device containing a packing embodying the invention;

Fig. 2 is a transverse section, somewhat diagrammatic, of the contacting device taken on line 2—2 of Fig. 1;

Fig. 3 is a side elevation of a pair of generally horizontal zig-zag packing elements contiguously arranged in the same plane to form a mesh strip, and constituting one embodiment of the invention;

Fig. 4 is a fragmentary side elevation of a form of packing the constituent elements of which are similar to those shown in Fig. 3, and are secured together against relative movement in accordance with one embodiment of the invention;

Fig. 5 is a section taken on line 5—5 of Fig. 4;

Fig. 6 is a fragmentary side elevation of another form of packing similar to that indicated in Figs. 4 and 5, except that the packing elements are secured together in a different way against relative movement in accordance with another embodiment of the invention;

Fig. 7 is a section taken on line 7—7 of Fig. 6;

Fig. 8 is a fragmentary side elevation of another form of packing similar to that shown in Figs. 4 and 5, except that the packing elements are differently secured together against relative movement in accordance with still another embodiment of the invention;

Fig. 9 is a section taken on line 9—9 of Fig. 8;

Fig. 10 is a fragmentary side elevation of another form of packing embodying the invention, the constituent zig-zag elements of the packing being shown extending generally vertically with contiguous elements in the same plane;

Fig. 11 is a fragmentary side elevation of another form of packing embodying the invention, similar to that shown in Fig. 10 excepting that the elements are interconnected against relative displacement in a different way;

Fig. 12 is a side elevation of a packing element similar to that indicated in Fig. 3, the two contiguous elements, however, being shown arranged generally horizontally in overlapping relationship to form a mesh strip embodying the invention;

Fig. 13 is a section taken on line 13—13 of Fig. 12;

Fig. 14 is a fragmentary side elevation of another form of packing embodying the invention, the constituent mesh strips of the packing being similar to those shown in Figs. 12 and 13;

Fig. 15 is a section taken on line 15—15 of Fig. 14;

Fig. 16 is a fragmentary side elevation of still another form of packing, in which contiguous elements are arranged generally horizontally in overlapping relationship, but are interconnected in another way in accordance with another embodiment of the invention;

Fig. 17 is a section taken on line 17—17 of Fig. 16;

Fig. 18 is a fragmentary side elevation of another form of packing embodying the invention, the zig-zag elements being generally horizontal and the different layers of the elements being regularly displaced out of wave phase to a different extent from that shown in the other illustrated form; and Fig. 19 is a section taken on line 19—19 of Fig. 18.

Referring to Figs. 1 and 2 of the drawings, the liquid and gas contacting device shown, comprises a vertical cylindrical column or tower 10 containing packing 11 of the invention. The gas to be contacted is delivered to the lower portion of the tower 10 below the packing 11, and flows upwardly through the packing, while the liquid is fed to the upper portion of the tower above the packing, and flows downwardly through the packing and in intimate contact with the ascending gas in a manner to be described. The liquid is desirably delivered to the upper portion of the tower 10 and over the packing 11 in such scattered form as to be spread substantially evenly over the top of a packing 11, so that the liquid is distributed substantially uniformly throughout the packing at its upper end. For that purpose, the liquid may be delivered over the packing 11 in spray form, or may be delivered by a liquid feed device similar to that shown and described in my copending application Serial No. 536,306, filed May 19, 1944, to feed the liquid in predetermined equally spaced thin streams over the packing.

The packing 11 is shown occupying the central portion of the tower 10, while the diametrically opposite side chordal sections 12 of the tower are left vacant or unpacked. A pair of partition plates 13 on the chordal sides respectively of the packing 11, prevent flow into or out of the packing through those sides. The unpacked spaces 12 of the tower 10 may be sealed either at the bottom or the top in any manner well-known in the art, to prevent by-pass flow through these spaces. The clearance between the circular peripheral portions of the packing 11 and the corresponding wall of the tower 10 may be sealed by any suitable means, as for example by means of layers 14 of glass wool.

In the form of the invention shown in Fig. 3, the packing 11 comprises a series of slender elements 16 which may be in the form of wires, tubes, rods or flat strips, and which are shown specifically as solid cylindrical rods. These packing elements 16 are identical in cross-sectional size, shape and finish, and their surfaces are of such material and finish as to be substantially wetted by the liquid under normal operating conditions. For that purpose, the packing elements are desirably of a material, such as metal or plastic for example, having the necessary finish to afford the required wetting properties.

Although the packing elements 16 are shown of cylindrical stock, as far as certain aspects of the invention are concerned, they may be of any suitable symmetrical cross-sectional shape. For example, the surface of the elements may be grooved, fluted or otherwise treated to form a regular pattern thereon. These surface grooves may extend parallel to the longitudinal axis of the elements 16, or may extend helically in the form of a thread. Such surface grooving of the elements 16 may be provided to increase the liquid carrying capacity of the elements. Also, instead of using single rods, wires or the like, as far as certain aspects of the invention are concerned, each of the packing elements may consist of multiple wires braided or helically twisted together, or laid side by side.

Each of the packing elements 16 is regularly zig-zagged to form a plurality of successive oblique turns or sections 17 of equal lengths and including equal angles, which need not necessarily be right angles. These elements 16 are arranged in general horizontal directions and in vertical planes, so that adjoining sections 17 of an element extend obliquely at the same inclination with the vertical. Contiguous elements 16 are disposed in reversed or inverted superposed relationship with the valley or trough apices 18 of the upper element in registering abutment with the peak apices 19 respectively of the lower element. The two contiguous superposed elements 16 thereby define therebetween a series of horizontally adjoining meshes 21, which desirably are in the form of equilateral parallelograms, and which are specifically shown as squares. Where the opposed apices 18 and 19 of vertically adjoining elements 16 come together, they form liquid mixing junction zones 22. Since all the elements 16 are substantially identical, except perhaps in overall lengths, any two adjoining oblique sections 17 of an upper element converging downwardly towards a mixing zone 22, will have the same inclinations with respect to the vertical, and the two corresponding sections 17 of a lower element contiguous with the upper element will diverge obliquely downwardly from the zone 22 at an inclination substantially equal to that of the upper sections.

The liquid flows downwardly along the oblique converging sections 17 of an upper element and towards the junction zones 22 in substantially equal streams. At each of these zones 22, the streams flowing along the corresponding pair of downwardly converging sections 17 are merged and thoroughly intermixed. The total liquid delivered to this zone 22 is then divided equally between the two lower oblique element sections 17 diverging downwardly from that zone.

The elements 16 as shown in Fig. 3, may be welded together as indicated at 23 at their junctions 22 desirably in such a way that the weld does not extend between the lower element sections 17 at these junctions. A weld irregularity on the bottom of a junction 22 between adjoining lower element sections 17 is apt to cause the liquid to drop therefrom vertically in the form of droplets. This dripping action would adversely affect the regularity of liquid flow through the packing. By welding superposed elements 16 together at their abutting junctions 22, the formation of welds at the bottom of the junctions between the angular sections 17 of the lower elements is avoided.

The elements 16 are horizontally stacked one on top of the other in a vertical plane with contiguous elements in reverse or inverted contacting relationship as indicated, to form a vertical latticed layer 24 as shown in Figs. 4 and 5. The meshes 21 of each layer 24 extend in vertical rows with the junctions 22 of each row defining the vertices of these meshes, and extending in vertical alignment, and the meshes of adjoining vertical rows medially staggered. This construction lends symmetry to the arrangement, provides a continuous solid path over which the liquid delivered to the top of the packing can flow downwardly, affords effective means of contacting the gas passing through the packing with the liquid exposed as a series of filmiform streams, and assures the turbulence necessary to secure mixing of the gases.

The vertical layers 24 are substantially identical as far as the size and shape of the meshes 21 and of the diameter of the elements 16 are concerned, and are arranged in face to face contact one behind the other to form the composite packing 11. The vertical layers 24 preferably are relatively displaced vertically, so that meshes 21 of one layer are out of wave phase or registry with the meshes of adjoining layers. In the specific form shown in Figs. 4 and 5, the meshes 21 of alternate vertical layers 24 are in horizontal registry, while the meshes of intervening layers are in horizontal registry but medially staggered with respect to the meshes of the other layers. In this honeycomb arrangement, the junction zones 22 of one vertical layer 24 would be disposed centrally with respect to the meshes 21 of adjoining layers. Each mesh 21 of a vertical layer 24 will thereby be divided by the adjoining layer into four openings 25 which are similar and of equal area and shape, and the horizontally opposed elements 16 of adjoining layers will intersect at the midway points 26 of the oblique element sections 17 to form additional liquid mixing zones at those points. Adjoining element sections 17 will extend at equal inclination towards and from these intersections 26.

With the arrangement as described, a small portion of a stream flowing from an abutment zone 22 along an element section 17 of a vertical layer 24, merges at an intersection zone 26 with a similar portion of the stream flowing from another abutment zone 22 along an element section of an adjoining vertical layer 24. In this manner, the liquid in one vertical layer 24 is not only distributed and mixed substantially uniformly throughout the width of that layer, but is also distributed and mixed with the liquid of adjoining vertical layers. Substantially uniform distribution and mixing of the liquid throughout the entire horizontal flow section of the packing 11 is thereby assured. The interstices or openings 25 defined by the adjoining layers 24 are large enough to prevent capillary filming of the downward flowing liquid across these openings, but are as small as possible having regard for the liquid-gas load. Also, the diameter of the elements 16 is desirably large enough so that the spaces between horizontally aligned elements of alternate layers are not spanned by the capillary filming of the liquid. To achieve this result, the diameter of the elements 16 varies according to the character of the liquid being treated. In a specific application, the elements 16 are about one-tenth of an inch in diameter, and consequently the alternate layers are spaced one-tenth of an inch apart. In any case, these spaces or openings between alternate elements should be such that they do not seal with the liquid under treatment.

The packing of Figs. 3 to 5 may be constructed in horizontal strips or sheets 27, and these sheets may then be stacked in tiers for assembly as shown in Fig. 4. Each of these sheets 27 may consist of a horizontal row of contiguous zig-zag elements 16 with alternate elements 16 reversely bent with respect to the intervening elements, and these elements interconnected together, as for example, by welds 23' at the intersections 26, to form a unit. These welds 23' preferably are on the upper sides of the intersections 26 to prevent irregularities at the bottom of each intersection 26 which would be undesirable, since they might cause the liquid to flow therefrom in the form of droplets or to be distributed unequally. The sheets 27 are stacked with the apices 18 and 19 of the elements 16 of superposed sheets in abutment. These sheets 27 can be held against horizontal displacement by welds 23 at the abutting apices 18 and 19 together, or if desired, other holding means may be employed, as will be made more apparent.

If desired, the composite packing may be made up of separate vertical layers 24 relatively displaceable vertically, or separate horizontal sheets 27 relatively displaceable horizontally. Either one of these arrangements may be employed, where, for example, it is desired to vibrate some of the vertical layers 24 or some of the horizontal sheets 27 through small amplitudes to promote turbulences in the fluid flow or to prevent clogging of the packing when used with liquid carrying solids in suspension.

Each zig-zag element 16 at its peak apices 19 supports the elements above it in the same vertical layer 24. The weighting of these elements 16 at their apices 19 tends to flatten or expand the elements 16 and thereby spread them endwise. The layers 24 are desirably arranged to extend parallel to the partition plates 13, so that the sides of these layers extend along the wall of the tower 10. Since the ends of the expansibly stressed elements 16 are confined by the walls of the tower 10 containing the packing, each of these elements will act as an individual truss of considerable strength. The tendency of the elements 16 to flatten out under weighting pressure is advantageously employed to assure the complete filling of the tower 10 in which they are confined. Under this pressure, the circular sides of the packing 11 yieldably press against the filling material 14 in the spaces between the packing sides and the wall of the tower, so that these spaces are effectively sealed against flow of fluid. This is particularly important, since the countercurrent fluids tend to segregate or collect on the enclosing walls, thus upsetting their uniform distribution.

The packing layers 24 are set snugly between the partition plates 13, so that the outside layers fit tightly against these partition plates and effectively serve to dam the liquid flowing down along these plates. The liquid thereby is returned by this damming action to mixing points in the packing from which it will be uniformly redistributed partly to the side walls of the tower 10 and partly to the packing itself.

Although the operation of the packing of Figs. 1 to 5 will be apparent from the foregoing description, it is briefly summarized at this point. In the use of this packing, the liquid with which it is desired to contact the ascending gases is delivered to the top section of the packing as described, and divides itself into a number of predetermined exposed filmiform streams which flow obliquely downwardly along the elements 16 on regular zig-zag courses in a direction generally counter to the direction of the flow of the gas. The maximum of liquid surface is thereby exposed to the action of the ascending gas. The liquid stream flowing down along a single oblique section 17 of an element 16 in one vertical layer 24, merges at an abutment junction 22 with the liquid stream flowing down an adjoining oblique section of the element. At this junction 22, the two streams are thoroughly intermixed, and the resulting mixture is then subdivided and redistributed equally between the element sections 17 diverging downwardly from the junction. Each of these diverging element sections 17 constitutes part of another pair of elements converging towards a junction 22, so that the two diverging distributed streams merge and intermix with other adjoining streams, and then again become subdivided. This process is repeated so that uniform mixing and distribution of the liquid throughout the width of each vertical layer 24 is assured. Also, a small portion of each liquid stream flowing along an oblique element section 17 merges at an intersection zone 26 with a similar portion of the stream flowing along an oblique element section 17 of the contiguous element of an adjoining vertical layer 24, and the mixed liquid is then equally subdivided between those parts of the element sections diverging downwardly from the intersection zone. The liquid in one vertical layer 24 is thereby not only distributed and mixed substantially uniformly throughout the width of the layer, but is also distributed and intermixed uniformly with the liquid of adjoining vertical layers.

If the flow along the different oblique element sections 17 is not equal, the degree of irregularity will tend to become progressively reduced due to the fact that each section will divide the whole of the liquid reaching a given mixing zone 22 or 26 equally with its element partner in that zone. This is particularly important in the upper section of the packing, where the liquid feed may not be deposited uniformly over the top of the packing. By the equalizing process described, the distribution of the liquid under these conditions will become uniform in the upper section of the packing. Uniform distribution of the liquid when once attained near the top of the packing will persist to the bottom of the packing. The gas passing upward generally countercurrent to the liquid is subjected to sufficient turbulence to insure thorough mixing, thus avoiding the loss of efficiency which results when gas at the liquid-gas interface is not mixed as rapidly as possible with the main bulk of the gas, and when other purely local conditions within the packing tend to vary the composition of the gas across any section of the tower 10.

As a result of the packing construction of the invention, the velocity of the gas upwardly will be substantially the same at any point in any plane at right angles to the general direction of flow. The maximum intimacy of contact and the maximum interaction between liquid and gas is obtained, and equilibrium is rapidly established between the material in either vapor or liquid phase immediately adjacent to the interface and the main bulk of the material comprising the phase. On any cross-section of the packing at right angles to the general direction of flow of the liquid and the gas, the composition of the gas is substantially the same and the composition of the liquid in its constituent streams is substantially the same. The pressure drop of the liquid passing through the packing and the amount of liquid retained by the packing under normal operating conditions is comparatively low. A comparatively long path of travel of the liquid passing through the packing is provided so that retention of the liquid for a period long enough to assure the necessary saturation or interaction with the gas is assured.

Figs. 6 and 7 show a packing in which the elements 16 are all identical and are constructed, shaped and arranged in a manner similar to that indicated in connection with the construction of Figs. 3 to 5, but are held together in a different manner. In this form, there is provided a series of cross-rods 30 extending horizontally across the packing at right angles to the planes of the elements 16, and arranged in pairs with the two rods of each pair disposed in vertical alignment on opposite sides of each intersection zone 26. These rods 30 preferably are secured so that one of each pair is affixed to one of the elements 16 at the intersection 26, while the other rod is secured to the other element at the intersection. In Fig. 6, the arrows are applied to some of the rods 30 to indicate the element 16 to which each is attached. These rods 30 extending at right angles to the elements 16 fix the position of these elements, and may be either sweated or otherwise affixed to the elements as indicated, or may be woven with the elements to afford a final pattern similar to that employed in the manufacture of wire gauze. The cross-rods 30 affixed and mounted as described, prevent the intersecting elements 16 of adjoining vertical layers 24 from being relatively displaced generally lengthwise of the elements.

The elements 16 diverge obliquely at such an angle from an intersection 26 that the liquid at the intersection tends to drain to them instead of forming liquid droplets. Also, by making the rods 30 of sufficiently small cross-section, the meniscus of the liquid formed at the bottom of an intersection 26 will not extend below the rod 30 at that intersection, thereby reducing the tendency to dripping at the intersection.

To prevent relative displacement between the stacked horizontal sheets or strips 27, cross-rods 31 are provided, these extending parallel to the cross-rods 30 and being arranged in pairs with the rods of each pair disposed in horizontal alignment on opposite sides of the abutment junctions 22 where the superposed packing sheets 27 meet. Arrows are applied to some of the cross-rods 31 to indicate the elements 16 to which each of the rods is attached. Some of the cross-rods 31 of one horizontal row are shown affixed to the peaks of alternate elements of a lower horizontal sheet 27, while the other cross-rods of the row are shown affixed to the bottom turns of every other element 16 staggered with respect to the alternate elements and disposed in the next upper horizontal sheet 27. These cross-rods 31 may be sweated or otherwise affixed to the elements in a manner similar to that indicated in connection with the cross-rods 30.

The method of assembly and attachment shown in Figs. 6 and 7 may be employed, for example, where it is desired to install the packing in an existing tower to which interior access can be obtained only through manholes or other restricted openings. In installing a packing of the type shown in Figs. 6 and 7 in such a tower, the straight rods or wires which comprise the elements 16 are made in the form of a strip having a width which would allow its passage through the available tower opening. The straight element rods or wires which make up a horizontal packing sheet 27, are arranged alongside of each other with the cross-rods 30 and 31 properly attached thereto to fix the position of the elements 16 during fabrication and installation. These elements, rods or wires are then bent along predetermined lines to impart the required zig-zag pattern to the element, rods or wires. The mesh strip so formed is then trimmed to conform to the circular shape of the tower walls, and the strips stacked and enmeshed to form the composite packing shown in Figs. 6 and 7. Since the distance between the partition plates 13 is an exact multiple of the diameter of the rods or wires constituting the elements 16, the composite packing will fit snugly between the plates.

Figs. 8 and 9 show a form of packing which is similar to that indicated in Figs. 6 and 7, except that the superposed horizontal sheets 27 are held against relative horizontal displacement by means of angles 34 extending transversely of the elements 16. At least two of such angles 34 would be required between each pair of contiguous horizontal sheets 27. One of these angles 34 would be snugly disposed in the horizontally aligned side corners formed between superposed alternate elements 16, while the other angle 34 desirably would be reversely disposed in mirror image relationship with respect to the first-mentioned angle, and would be snugly disposed in the horizontally aligned side corners formed between superposed elements 16 staggered with respect to the alternate elements. These angles 34 are affixed desirably by welding to the elements 16 they contact, so that the horizontal packing sheets 27 are held against relative horizontal displacement lengthwise generally of the elements.

In Fig. 10 is shown another form of packing in which the zig-zag elements 16a extend generally vertically instead of horizontally. In all other respects, the packing is similar to that indicated in connection with the constructions of Figs. 6 and 7. As in the constructions of Figs. 6 and 7, the packing of Fig. 10 may be made of sheets 27a of standard width, which are meshed together vertically instead of horizontally. The fitting of the packing sheets 27a to the curved surface of the tower can be achieved by variations in the width of these packing sheets. The cross-rods 30a extending horizontally across the packing at right angles to the planes of the elements 16a are arranged in pairs with the two rods of each pair disposed in horizontal alignment on opposite sides of each intersection zone 26a. These cross-rods 30a are desirably secured so that one of each pair is affixed to one of the elements 16a at the intersection 26a, while the other rod is secured to the other element of the intersection as indicated by the arrows applied to some of the cross-rods. The cross-rods 31a provided to prevent relative vertical displacement between the vertical packing sheets 27a are arranged in pairs with the rods of each pair disposed in vertical alignment on opposite sides of the row of horizontally aligned abutment junctions 22a where the adjoining vertical packing sheets 27a meet. The arrows applied to some of the rods 31a indicate the elements 16a to which each of the rods is affixed.

In the construction of Fig. 10, each element 16a supports its own weight, and is yieldably pressed against adjacent elements. The effect of this weighting in expanding the packing against the curved wall of the tower 10 is similar to that obtained in the horizontal packing described in connection with the construction of Figs. 3, 4 and 5. The arrangement shown in Fig. 10 can be installed between the partition plates 13 and the packing held under tension until the last vertical layer has been installed. The release of this pressure causes each element 16 to expand under its own weight, and thereby serves to effectively close the small gap which it is necessary to leave in order to install the last vertical layer of the packing.

Fig. 11 shows a packing construction similar to that shown in Fig. 10, except that the vertical sheets 27a are held against relative vertical displacement by means of angles 34a disposed snugly in the corners formed at the abutment junctions 22a between adjoining sheets. One of these angles 34a is affixed by welding or the like to the elements 16 of alternate vertical layers, while the other angle is affixed to the elements of intervening layers, as in the construction of Figs. 8 and 9.

In all of the constructions so far described, the elements in each vertical layer are disposed in abutment in the same vertical plane. In the form of the invention shown in Figs. 12, 13, 14 and 15, the individual elements 16b are bent to form a zig-zag of equal successive turns as in the constructions of Figs. 3 to 11, but the contiguous horizontal elements instead of being reversely disposed in abutment in the same vertical plane, are disposed with the apices of adjoining elements in contacting overlapping relationship to form liquid mixing zones 22b, and to define the meshes 21b between the elements. Contiguous elements 16b are interconnected at these junction zones 22b desirably by sweating, welding or the like.

In the arrangement of Figs. 12–15, the peak apices 19b of a lower element 16b overlap the trough apices 18b respectively of an upper element in such a way that the outer point of the apex section of one element is in horizontal alignment with the inner corner point of the corresponding apex section of the other element. It is desirable not to have the outer point of the apex trough section of the upper element 16b extend below the inner corner point of the corresponding apex peak section of the lower element in order to avoid dripping at the junction zones 22b as much as possible. In any case, in order to avoid dripping, the relative position between the two contiguous upper and lower elements 16b should be such that when liquid is flowing over them, the lowest trough apex point of the upper element will not be below the meniscus of the liquid formed on the inner corner of the peak apex of the lower element. This relative positioning of the two elements 16b varies according to the apex angle of the lower element and the physical characteristics of the liquid. Adjoining oblique sections 17b of an upper element 16b converge downwardly towards their junction zone 22b at equal inclinations, and corresponding adjoining oblique sections 17b of a lower element diverge downwardly from the junction zone at equal inclinations, which is the same as that of the upper element sections. The meshes 21b formed between vertically adjoining contiguous elements desirably are in the form of equilateral parallelograms, and are specifically shown substantially square shape, although angles other than right angles may be employed.

The elements 16b are arranged in vertical sheets 40, each of which comprises a series of horizontal elements 16b positioned in apically overlapping relationship with alternate elements in the same plane as shown in Figs. 13 and 15. The vertical sheets 40 are desirably arranged in face to face contact with the meshes 21b of adjoining sheets in horizontal registry and the junction zones 22b of adjoining sheets in contact and in horizontal alignment. In this arrangement, since the meshes 21b are not subdivided into smaller openings by the staggering of the alternate vertical sheets as in the constructions of Figs. 4 to 11, the width of the meshes 21b would be much smaller than the corresponding meshes 21 in the construction of Figs. 4 to 11. Although all of the vertical sheets 40 are shown in horizontal mesh registry, as far as certain aspects of the invention are concerned, these sheets may be arranged in staggered relationship as in the construction of Figs. 4 to 11. The packing may be formed in vertical sheets 40 as described, with the elements welded or otherwise interconnected to form a unit, and the different sheets may then be arranged one behind the other in the tower 10 between the partition plates 13.

Another method of assembly is to form horizontal sheets 41, each comprising a horizontally aligned row of upper parallel elements 16b, and an adjoining horizontally aligned row of lower parallel elements 16b, the elements of the two rows overlapping at their apices and interconnected by welding or the like into a sheet unit. The horizontal sheets 41 so formed can then be stacked and intermeshed as shown in Figs. 14 and 15, and the sheets held together against vertical displacement by welding or the like.

In Figs 16 and 17 is shown a form of packing, in which each horizontal element 16c is bent by equal alternate turns to form a regular zig-zag as in the constructions of Figs 3–15, but in which the opposed apices 18c and 19c of vertically adjoining elements overlap into interlocking engagement with horizontal rods 45 extending substantially at right angles to the planes of the elements. The apical overlap between contiguous elements 16b is such as to leave openings through which the rods 45 extend, so that the elements 16c of an upper horizontal row support the rods 45, while the elements of the lower contiguous horizontal row hang down and are suspended from these rods. The apical junctions 22c, where vertically adjoining elements overlap and interlock with the rods 45, form liquid mixing zones. Since the lower bends of upper elements 16c project below the inner corners of the upper bends of the lower elements at these mixing zones 22c, provisions must be made to prevent dripping of the liquid from these projections. For that purpose, the angle of the zig-zag bends of the elements 16b are more acute than those in the constructions of Figs. 3–15 described, and the rods 45 and elements 16c are dimensioned to insure that the bottom of the lower bends of the upper elements do not project below the bottom of the meniscus of the liquid formed in the inner corners of the upper bends of the lower elements. As a result of the acuteness of the apex angles of the elements 16c, the meshes 21c formed by these elements will be substantially diamond shaped with their longer axes extending vertically.

The packing can be built and assembled from the top down in successive horizontal layers, the last layer being suspended through the interlocking rods 45 from the next upper layer. All the vertical sheets of the packing may be disposed in face to face contact and in horizontal registry, or the sheets may be alternately staggered in a manner similar to that already described in connection with the construction of Figs. 3 to 15 to divide the meshes 21c into smaller equal openings.

In the constructions of Figs. 4 to 16, vertical sheets have been arranged with alternate sheets staggered, and with the distance between successive horizontally aligned parallel elements of alternate sheets equal to the diameter of the elements. This arrangement affords small gas passages between horizontally opposed elements, and thereby produces increased efficiency. However, as far as certain aspects of the invention are concerned, the distance between successive horizontally opposed parallel elements may be increased, as for example to two, three or four times the diameter of the elements, and the surface of the packing increased at the expense of this increased spacing of the elements. Such increased spacing of the elements may be desirable in some cases.

Figs. 18 and 19 show a construction in which the distance between successive horizontally aligned parallel zig-zagged elements 16d is a multiple of the diameter of the elements, and the intervening elements are equally and symmetrically displaced out of wave phase relationship with each other and with the aligned elements. The elements 16d made of rod-like or other similar stock, are identical in cross-sectional size and shape, and are zig-zagged to form equal successive oblique turn sections 17d having equal inclinations. The distance between horizontally aligned parallel elements 16d is shown as three times the diameter of the elements, interposed between these two horizontally aligned elements 16d are three similar elements 16d disposed in face to face contact with their peak apices 19d disposed at the same horizontal level, and displaced by equal distances out of wave phase or horizontal registry. Where the successive elements 16d intersect, they form liquid mixing zones 26d. The elements 16d may be connected together at these intersection mixing zones 26d by welding or the like as previously described, to form horizontal sheets 27d as shown in Figs. 18 and 19. These sheets 27d may be stacked with the trough apices 18d of the elements 16d of an upper sheet in abutting coplanar contacting relationship with the peak apices 19d of the corresponding elements of a lower sheet, as in the construction of Figs. 3, 4 and 5, and as shown in Figs. 18 and 19, to form liquid mixing zones 22d where the elements abut, or may be stacked with the trough apices 18d of the elements 16d of the upper sheet in overlapping contacting relationship with the peak apices 19d of the corresponding elements of the lower sheets, as shown in the constructions of Figs. 12 to 15, to form liquid mixing zones where these elements are in overlapping contact. The elements 16d of superposed sheets 27d may be welded as previously described, or otherwise interconnected where they contact at their apices. Also, if desired, the horizontal sheets 27d may be enmeshed and interconnected by means of cross-rods as in the construction of Figs. 17 and 18.

In all the forms shown, the liquid with which it is desired to contact the gases flows regularly and substantially evenly in a series of thin films over the surfaces of the oblique sections of the packing elements in a direction generally counter to the direction of the flow of the vapor. The liquid flowing down a single oblique element section of the packing is regularly mixed with liquid flowing down adjacent oblique element sections of the packing, and the resulting mixture is then redistributed among oblique element sections diverging from the zone of mixing. Each of these latter element sections carries substantially the same aliquot part of the liquid reaching the mixing zone from above. The spaces or openings between the elements are such as to prevent the formation of capillary filming of the liquid across these openings, thereby assuring regularity in the flow of the liquid over the elements.

Although in all of the forms shown, only two oblique element sections converge downwardly towards each liquid mixing zone, and only two similar oblique element sections diverge downwardly from each liquid mixing zone, as far as the broader aspects of the present invention are concerned, any number of oblique element sections at equal inclinations may converge downwardly towards to a juncture to form a liquid mixing zone, and a similar number of oblique element sections at equal inclinations may diverge downwardly from each juncture zone, as shown in my copending application Serial No. 529,246, filed April 3, 1944 (now Patent No. 2,405,594, dated April 13, 1946). This copending application shows an arrangement in which a triad of converging and diverging elements at equal inclinations is provided at each junction mixing zone. As alternative forms, tetrads and pentads of elements are shown provided at each junction zone.

Also, as far as the broader aspects of the invention are concerned, instead of having all of the zig-zag elements in parallel vertical planes, these zig-zag elements may be criss-crossed at right angles to each other, as shown in my copending application Serial No. 528,541, filed March 29, 1944 (now Patent No. 2,424,248, dated July 22, 1947) so that the peaks of one element are looped over and supported on the troughs of the other.

It also will be understood that as far as the broader aspects of the invention are concerned, instead of having the elements in the form of separate slender units zig-zagged as shown, the elements may be part of an expanded vertical lath sheet, as shown in my copending application Serial No. 528,542, filed March 29, 1944, abandoned as of Nov. 15, 1947.

Also, as far as the broader aspects of the invention are concerned, instead of having elements zig-zagged and arranged as described, the elements may be straight and criss-crossed obliquely at equal inclinations to form a lattice with a series of intersectional liquid mixing zones as shown in my copending application Serial No. 521,049, filed February 4, 1944 (now Patent No. 2,405,593 dated April 13, 1946).

The type of packing herein described is applicable for contacting liquid and gas devices, such as bubble towers, scrubbers, cooling towers, fractionating towers and the like, but it is not intended that the packing should be limited to these types of equipment. It is also contemplated that the packing itself may be used as a catalyst. Under these conditions, the packing itself may, for example, be made of nickel, copper, or any of the solid materials having the required catalytic properties. For that purpose, the catalytic packing may serve to increase the rate of reaction by contact with a gas, or by contact with a liquid. As another example of the use of the packing of the invention, it may serve as a catalyst carrier, the catalyst, for example, being formed into beads which are threaded on the elements defining the packing. Also, if desired, the surface of the packing elements may be subjected to special treatment to form a layer of catalytic material thereon. As another example of the use to which the packing may be put, it may serve as a carrier of a catalyst which takes the form of a liquid, and particularly a high viscous liquid such as phosphoric acid.

Inasmuch as parts of the elements extended in a downwardly inclined direction from the inner wall of the tower 10, liquid which reaches the wall by way of some of the elements will flow away from the wall by way of other elements and thus will tend to retain the liquid in the packing and prevent short circuiting flow down the wall of the tower.

The velocity of the vapor flowing upwardly through the packing will cause or tend to cause the liquid on the vertically inclined portions of the elements to assume a streamlined or tear drop shape such as would present the minimum resistance to the flow of vapors and this, together with the surface effects which become pronounced with thin films of liquid, will have the effect of distributing the liquid over the surfaces of the elements with a tendency for a major part of the liquid to flow down the upper parts of the elements, the amount of liquid so flowing increasing with increased vapor velocity. The effect of this is to insure the maximum exposure of the liquid to the vapor and to facilitate the mixing of the streams of liquid at the juncture points.

As many changes can be made in the apparatus disclosed herein, and many apparently widely different embodiments of the invention can be made without departing from the scope of the claims, it is intended that all matter contained in the above description or shown in the accompanying drawings shall be interpreted as illustrative and not in a limiting sense.

What is claimed is:

1. A packing for a liquid contacting device comprising a plurality of zig-zag slender elements of equal turns, the apex sections of adjoining elements being in contact to form between said adjoining elements a row of equal meshes, and to form liquid mixing junction zones where these apex sections are in contact, and a plurality of cross-rods arranged in pairs with the rods of each pair extending on opposite sides of a junction zone to prevent the elements at said latter zone from being relatively displaced.

2. A packing for a liquid contacting device comprising a plurality of parallel vertical layers, each including a series of zig-zag slender elements of equal turns, the apex sections of adjoining elements in each layer being in contact to form between said elements a row of equal meshes, and to form liquid mixing junction zones where these apex sections are in contact, and a series of horizontal cross-rods extending parallel substantially at right angles to the vertical planes of said layers and arranged in pairs, the rods of each pair extending on opposite sides of a junction zone and connected to respective elements at said zone to prevent the elements at said zone from being relatively displaced.

3. A packing for a liquid contacting device, comprising a plurality of parallel vertical layers, each including a plurality of zig-zag slender elements of equal turns, the apex sections of adjoining elements in each layer being in abutting relation and in the same vertical plane to form a row of equal meshes between said elements and to form liquid mixing junction zones where these apex sections are in contact, said layers being arranged so that rows of horizontally aligned junction zones are formed, and a series of horizontal cross-rods extending parallel substantially at right angles to the vertical planes of said layers and arranged in pairs, the rods of each pair extending on opposite sides of a row of horizontally aligned junction zones and being connected to respective elements at said latter zones to prevent the elements at said latter zones from being relatively displaced.

4. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections, the elements of each sheet being adjacently disposed in inverted relationship with the trough apices of one element secured in registering abutment with the peak apices of one of the adjacent elements in said sheet and the peak apices of said one element being secured in registering abutment with the trough apices of the other of the adjacent elements in said sheet, the abutting apices thereby forming liquid mixing zones the sheets of said packing being disposed in face to face relationship in contiguous parallel generally vertical planes.

5. Vapor and liquid contacting apparatus packing for a contacting device with generally vertical countercurrent flow, said packing having a plurality of sheets, each sheet extending in a generally vertical plane, said sheet comprising a plurality of slender elements with a continuous surface, the elements being of zig-zag shape with alternately arranged apices interconnected by oblique sections, the elements of each sheet being adjacently disposed in inverted relationship with the trough apices of one element secured in registering abutment with the peak apices of one of the adjacent elements in said sheet and the peak apices of said one element being secured in registering abutment with the trough apices of the other of the adjacent elements in said sheet, the abutting apices thereby forming liquid mixing zones, the sheets of said packing being disposed in face to face relationship in contiguous parallel generally vertical planes, with the zones of alternate sheets being staggered with respect to zones of sheets adjacent said alternate sheets.

6. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections of equal length extending from said apices at equal angles, the elements of each sheet being adjacently disposed in inverted relationship with the trough apices of one element secured in registering abutment with the peak apices of one of the adjacent elements in said sheet and the peak apices of said one element being secured in registering abutment with the trough apices of the other of the adjacent elements in said sheet, the abutting apices thereby forming liquid mixing zones, the sheets of said packing being disposed in face to face relationship in contiguous parallel generally vertical planes.

7. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections, the elements of each sheet being adjacently disposed in inverted relationship with the trough apices of one element secured in registering abutment with the peak apices of one of the adjacent elements in said sheet and the peak apices of said one element being secured in registering abutment with the trough apices of the other of the adjacent elements in said sheet, the abutting apices thereby forming liquid mixing zones, said oblique sections forming the sides of a quadrilateral mesh, the length of said oblique sections being such that the meshes so formed are large enough to prevent capillary filming of the liquid across said meshes, the sheets of said packing being disposed in contiguous parallel vertical planes, with the zones of alternate sheets being staggered with respect to zones of sheets adjacent said alternate sheets.

8. Vapor and liquid contacting apparatus packing having a plurality of sheets, each sheet extending in a generally vertical plane, said sheets comprising a plurality of generally horizontally extending slender elements with a continuous surface, the elements being of zig-zag shape with alternately arranged apices interconnected by oblique sections, the elements of each sheet being adjacently disposed in inverted relationship in the same vertical plane and with the trough apices of one element secured in registering abutment with the peak apices of one of the adjacent elements in said sheet and the peak apices of said one element being secured in registering abutment with the trough apices of the other of the adjacent elements in said sheet, the abutting apices thereby forming liquid mixing zones, the sheets of said packing being disposed in face to face relationship in contiguous parallel generally vertical planes.

9. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections, the elements of each sheet being adjacently disposed in inverted relationship with the trough apices of one element secured in registering abutment with the peak apices of one of the adjacent elements in said sheet and the peak apices of said one element being secured in registering abutment with the trough apices of the other of the adjacent elements in said sheet, the apices of said one element and said adjacent elements being brought together in overlapping contact relationship, the abutting apices thereby forming liquid mixing zones, the sheets of said packing being disposed in face to face relationship in contiguous parallel vertical planes.

10. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections, the elements of each sheet being adjacently disposed in inverted relationship with the trough apices of one element secured in registering abutment with the peak apices of one of the adjacent elements in said sheet and the peak apices of said one element being secured in registering abutment with the trough apices of the other of the adjacent elements in said sheet, the apices of said one element and said adjacent elements being brought together in overlapping contact relationship, the abutting apices thereby forming liquid mixing zones, the sheets of said packing being disposed in face to face relationship in contiguous parallel vertical planes, with the zones of alternate sheets in horizontal register with respect to the mixing zones of adjacent sheets.

11. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections, the elements of each sheet being adjacently disposed in inverted relationship and in the same vertical plane with the trough apices of one element in registering abutment with and secured to the peak apices of one of the adjacent elements in said sheet and the peak apices of said one element being in registering abutment with and secured to the trough apices of the other of the adjacent elements in said sheet, the abutting apices thereby forming liquid mixing zones, the sheets of said packing being disposed in face to face relationship in contiguous parallel generally vertical planes.

12. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections, the elements of each sheet being adjacently disposed in inverted relationship and in the same vertical plane with the trough apices of one element in registering abutment with and secured to the peak apices of one of the adjacent elements in said sheet and the peak apices of said one element being in registering abutment with and secured to the trough apices of the other of the adjacent elements in said sheet, the abutting apices thereby forming liquid mixing zones, the sheets of said packing being disposed in face to face relationship in contiguous parallel generally vertical planes, with the zones of alternate sheets being staggered with respect to zones of sheets adjacent said alternate sheets.

13. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections, the elements of each sheet being adjacently disposed in inverted relationship with the trough apices of one element disposed in registering abutment with the peak apices of one of the adjacent elements in said sheet and the peak apices of said one element being disposed in registering abutment with the trough apices of the other of the adjacent elements in said sheet, the abutting apices thereby forming liquid mixing zones, the sheets of said packing being disposed in face to face relationship in contiguous parallel generally vertical planes, and a plurality of cross-rods arranged in pairs with the rods of each pair extending and secured in position on opposite sides of the junction formed at said mixing zones to prevent the elements at said latter zones from being relatively displaced.

14. Vapor and liquid contacting apparatus packing having a plurality of sheets, each sheet extending in a generally vertical plane, said sheets comprising a plurality of slender elements with a continuous surface, the elements being of zig-zag shape with alternately arranged apices interconnected by oblique sections of equal length extending from said apices at equal angles, the elements of each sheet being adjacently disposed in inverted relationship with the trough apices of one element secured in registering abutment with the peak apices of one of the adjacent elements in said sheet and the peak apices of said one element being secured in registering abutment with the trough apices of the other of the adjacent elements in said sheet, the apices of said one element and said adjacent elements being brought together in overlapping contact relationship, the abutting apices thereby forming liquid mixing zones, the sheets of said packing being disposed in face to face relationship in contiguous parallel generally vertical planes.

FRANCIS L. MELVILL.

REFERENCES CITED

The following references are of record in the file of this patent:

UNITED STATES PATENTS

| Number | Name | Date |
|---|---|---|
| 405,064 | Wood | June 11, 1889 |
| 980,602 | Clark | Jan. 3, 1911 |
| 1,804,132 | Tashjian | May 5, 1931 |
| 2,133,450 | Heil | Oct. 18, 1938 |

FOREIGN PATENTS

| Number | Country | Date |
|---|---|---|
| 25,933 | Great Britain | Dec. 19, 1901 |
| 25,349 | Great Britain | Nov. 5, 1912 |
| 147,213 | Great Britain | Apr. 7, 1921 |
| 427,087 | Great Britain | Apr. 16, 1935 |
| 321,768 | Germany | June 14, 1920 |
| 326,985 | Germany | Oct. 5, 1920 |
| 576,026 | Germany | May 5, 1933 |